United States Patent
Tezuka et al.

(10) Patent No.: US 11,709,473 B2
(45) Date of Patent: Jul. 25, 2023

(54) DISPLAY UNIT

(71) Applicant: FANUC CORPORATION, Yamanashi (JP)

(72) Inventors: Junichi Tezuka, Yamanashi (JP); Hiroyuki Uchida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 505 days.

(21) Appl. No.: 17/065,954

(22) Filed: Oct. 8, 2020

(65) Prior Publication Data

US 2021/0132570 A1     May 6, 2021

(30) Foreign Application Priority Data

Nov. 1, 2019   (JP) ................. 2019-199549

(51) Int. Cl.
*G05B 19/401*   (2006.01)
*G06F 3/14*   (2006.01)

(52) U.S. Cl.
CPC ............ *G05B 19/401* (2013.01); *G06F 3/14* (2013.01); *G05B 2219/42163* (2013.01)

(58) Field of Classification Search
None
See application file for complete search history.

(56) References Cited

U.S. PATENT DOCUMENTS

| | | | |
|---|---|---|---|
| 2004/0225484 A1* | 11/2004 | Hamann | G05B 19/4069 700/83 |
| 2019/0291228 A1* | 9/2019 | Bandoh | B24B 49/00 |
| 2020/0293021 A1* | 9/2020 | Goya | G05B 19/4069 |

FOREIGN PATENT DOCUMENTS

| | | |
|---|---|---|
| JP | 5197640 B2 | 5/2013 |
| JP | 2017-030066 A | 2/2017 |
| JP | 6366875 B1 | 8/2018 |

* cited by examiner

*Primary Examiner* — Sean Shechtman
(74) *Attorney, Agent, or Firm* — Studebaker & Brackett PC

(57) ABSTRACT

The present disclosure is intended to provide a technique which enables a direct visual comparison between a computationally-machined surface profile determined based on motor position information and a machined surface profile obtained by actual measurement of a machined surface. A display unit includes: a motor position information acquirer that acquires motor position information including at least one of a command position or a real position of a motor; a machine information acquirer that acquires machine information including a drive shaft configuration, a tool geometry, and a shape of an unmachined workpiece; a machined surface profile simulator that performs a simulation of machining a workpiece based on a machining program, and determines a computationally-machined surface profile of the workpiece simulated to be machined, based on the motor position information and the machine information; a machined surface profile measurer that measures a machined surface profile of a machined workpiece that has actually been machined based on the machining program; and a machined surface profile display that displays the computationally-machined surface profile determined by the machined surface profile simulator, in parallel with the machined surface profile measured by the machined surface profile measurer.

4 Claims, 3 Drawing Sheets

DISPLAY UNIT

This application is based on and claims the benefit of priority from Japanese Patent Application No. 2019-199549, filed on 1 Nov. 2019, the content of which is incorporated herein by reference.

BACKGROUND OF THE INVENTION

Field of the Invention

The present invention relates to a display unit.

Related Art

Drive shafts of a machine tool are driven by motors. It has been known that a degree of accuracy of position control on the motors considerably affects the result of machining.

For this reason, there are various known techniques for determining causes of a defective surface on a machined surface and contour errors of a workpiece machined using a machine tool or the like (see, e.g., Japanese Patent No. 6366875, Japanese Patent No. 5197640, and Japanese Unexamined Patent Application, Publication No. 2017-30066).
Patent Document 1: Japanese Patent No. 6366875
Patent Document 2: Japanese Patent No. 5197640
Patent Document 3: Japanese Unexamined Patent Application, Publication No. 2017-30066

SUMMARY OF THE INVENTION

However, at present, there is no known technique which enables direct comparison between a computationally-machined surface profile determined based on motor position information and a machined surface profile obtained by actual measurement of a machined surface of a machined workpiece. Currently, it takes a long time to identify the causes of a defective surface on a machined surface and contour errors.

Against the foregoing background, there is a demand for a technique which enables a direct visual comparison between a computationally-machined surface profile determined based on motor position information and a machined surface profile obtained by actual measurement of a machined surface of a machined workpiece.

An aspect of the present disclosure is directed to a display unit for displaying a machined surface profile of a workpiece. The display unit includes: a motor position information acquirer that acquires motor position information including at least one of a command position or a real position of a motor that drives a drive shaft of a machine tool; a machine information acquirer that acquires machine information including a drive shaft configuration and a tool geometry of the machine tool, and including a shape of an unmachined workpiece; a machined surface profile simulator that performs a simulation of machining a workpiece based on a machining program, and determines a computationally-machined surface profile of the workpiece simulated to be machined, based on the motor position information acquired by the motor position information acquirer and the machine information acquired by the machine information acquirer; a machined surface profile measurer that measures a machined surface profile of a machined workpiece that has actually been machined based on the machining program; and a machined surface profile display that displays the computationally-machined surface profile determined by the machined surface profile simulator, in parallel with the machined surface profile measured by the machined surface profile measurer.

The present disclosure enables a user to visually and directly compare a computationally-machined surface profile determined based on motor position information with a machined surface profile obtained by actual measurement of a machined surface of a machined workpiece. As a result, causes of a defective surface on a machined surface and contour errors can be identified in a short period of time.

DETAILED DESCRIPTION OF THE INVENTION

An embodiment of the present disclosure will be described in detail with reference to the drawings.

Figure 1:
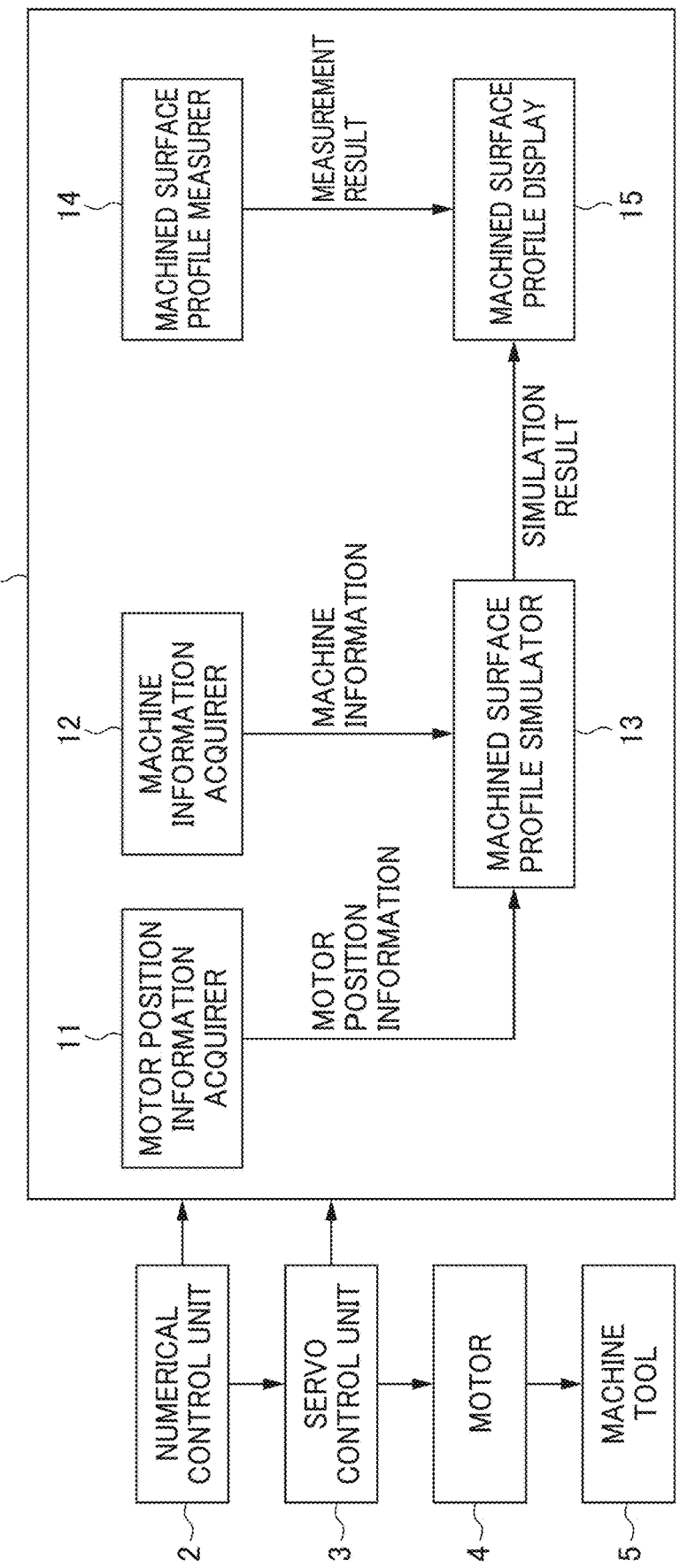
FIG. 1 is a functional block diagram showing a configuration of a machining system including a display unit according to an embodiment.

FIG. 1 is a functional block diagram showing a configuration of a machining system 100 including a display unit 1 according to the present embodiment. As shown in FIG. 1, the machining system 100 includes the display unit 1, a numerical control unit 2, a servo control unit 3, a motor 4, and a machine tool 5.

The numerical control unit 2 generates a position command for the motor 4, based on a machining program produced by computer aided manufacturing (CAM). A position defined by this position command signifies a command position of the motor 4. The numerical control unit 2 has machine information stored in a rewritable memory such as an EEPROM, the machine information including a drive shaft configuration and a tool geometry of the machine tool 5 to be described later, and a shape of an unmachined workpiece.

The servo control unit 3 generates a drive current for the motor 4, based on the position command from the numerical control unit 2 and position feedback resulting from detection by an encoder provided to the motor 4.

The motor 4 is provided to the machine tool 5. The motor 4 includes motors for driving movable parts of the machine tool 5, such as a tool feed shaft and a workpiece feed shaft. The motor 4 is provided with the encoder (not shown) that detects a rotational position (angle of rotation) of the motor 4. The rotational position detected by the encoder signifies the real position of the motor 4, and is used as the position feedback. Since the rotational position of the motor 4 is in correspondence with the positions of the movable parts of the machine tool 5, the rotational position detected by the encoder, i.e., the position feedback indicates a position of the tool and a position of the workpiece.

The machine tool 5 is configured as, for example, an apparatus for cutting a surface of the workpiece (machining target) using a ball end mill or the like. The drive shafts of the machine tool 5 are driven by the motor 4.

Next, the display unit 1 according to the present embodiment will be described in detail. The display unit 1 according to the present embodiment is composed of an arithmetic processing device such as a computer, including a CPU, a ROM, a RAM, and the like. Although FIG. 1 shows an example in which the display unit 1 is composed of a computer or the like that is separate from the numerical control unit 2, the display unit 1 may be integrated with the numerical control unit 2.

As shown in FIG. 1, the display unit 1 of the present embodiment includes a motor position information acquirer 11, a machine information acquirer 12, a machined surface profile simulator 13, a machined surface profile measurer 14, and a machined surface profile display 15.

The motor position information acquirer 11 acquires motor position information including at least one of the command position or the real position of the motor 4 that drives the drive shafts of the machine tool 5. Specifically, the command position of the motor 4 is acquired from the numerical control unit 2. The real position of motor 4 is acquired from the servo control unit 3.

The machine information acquirer 12 acquires the machine information including the drive shaft configuration and the tool geometry of the machine tool 5, and including the shape of the unmachined workpiece. Specifically, the machine information is acquired from the numerical control unit 2. Alternatively, the machine information may be directly inputted to, and set in, the display unit 1 by a user, and acquired by the machine information acquirer 12.

The machined surface profile simulator 13 performs a simulation of machining a workpiece, based on the machining program produced by the CAM described above. Further, the machined surface profile simulator 13 determines a computationally-machined surface profile of the workpiece simulated to be machined, based on the motor position information acquired by the motor position information acquirer 11 and the machine information acquired by the machine information acquirer 12.

Specifically, the machined surface profile simulator 13 computes a tool course based on the machining program and the motor position information of the drive shafts of the machine tool 5, and simulates a three-dimensional machined profile based on the tool geometry and the shape of the unmachined workpiece. The computationally-machined surface profile of the workpiece is determined from the results of the simulation.

The machined surface profile measurer 14 measures and obtains a machined surface profile of a machined workpiece that has actually been machined based on the machining program produced by the CAM described above. Any measurement device may be used as long as it can measure a machined surface profile. For example, based on a result of measurements conducted using a known surface roughness meter, the machined surface profile of the machined workpiece can be determined.

Figure 2:
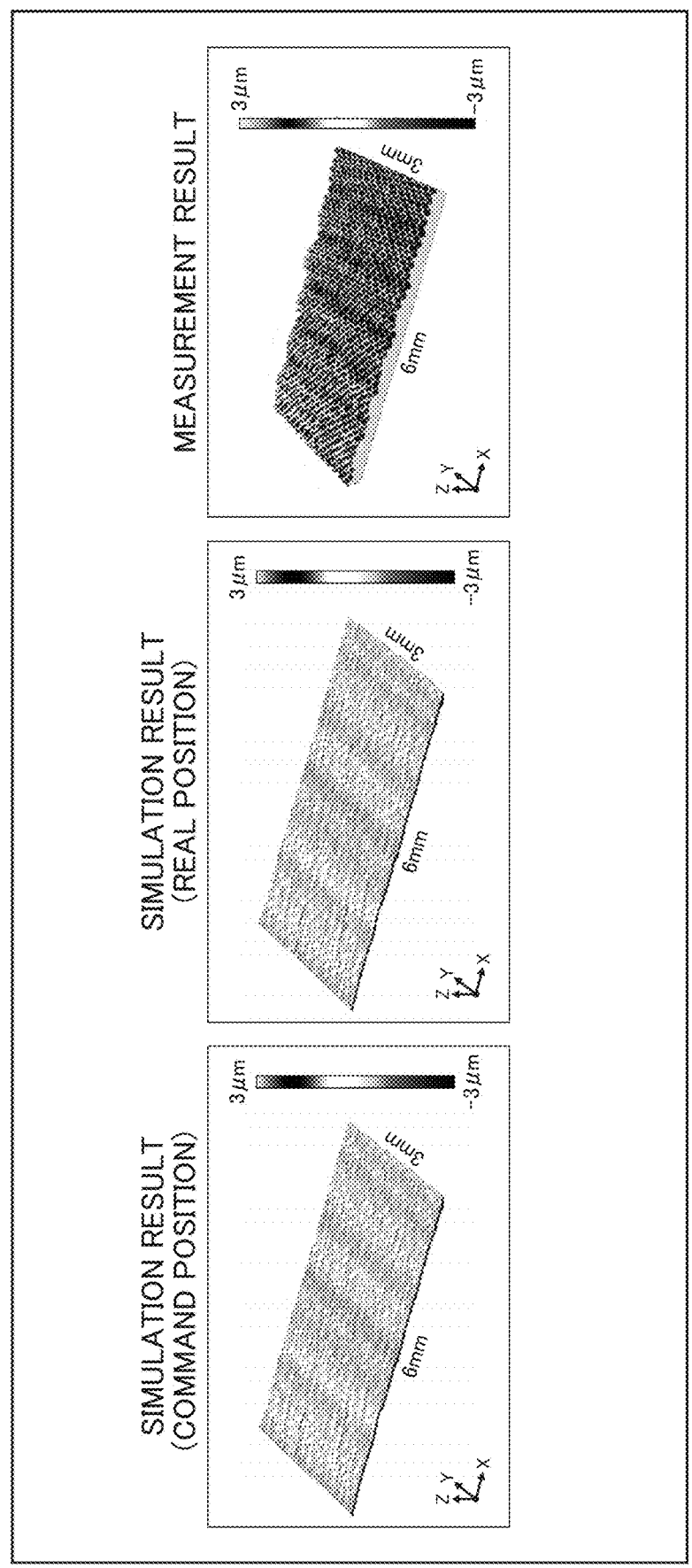
FIG. 2 shows a display screen of the display unit according to the embodiment.

The machined surface profile display 15 displays the computationally-machined surface profile determined by the machined surface profile simulator 13 and the machined surface profile measured by the machined surface profile measurer 14 in parallel with each other. Here, reference is made to FIG. 2 showing a display screen of the display unit 1 according to the present embodiment. As shown in FIG. 2, the display unit 1 of the present embodiment can display a computationally-machined surface profile determined by the simulation based on the command position, a computationally-machined surface profile determined by the simulation based on the real position, and a machined surface profile based on the result of the actual measurement conducted by the machined surface profile measurer 14, in parallel on the same display screen.

As a non-limiting example, FIG. 2 shows, as each machined surface profile, an image of a region having a length of 3 mm and a width of 6 mm, as viewed obliquely from above. In the image of each machined surface profile, the heights and depths of surface protrusions and surface recesses with respect to a reference plane are represented by different colors in the range from −3 μm to 3 μm.

Preferably, the machined surface profile display 15 displays the machined surface profiles at the same position, the same angle, and the same magnification, with respect to each other. Specifically, the machined surface profiles are displayed in alignment with each other in terms of the directions of the X- and Y-axes and the position of the origin on the reference plane. This feature makes it easy to compare the machined surface profiles.

More preferably, when a change is made to the position, the angle, or the magnification at which one of the three machined surface profiles is displayed, the machined surface profile display 15 changes the position, the angle, or the magnification at which the rest of the machined surface profiles are displayed, in conjunction with the change to the one machined surface profile. For example, if a user changes the position, the angle, or the magnification of one of the machined surface profiles by manipulating a mouse, a touch panel, or the like, the same change is automatically made to the rest of the machined surface profiles, whereby all the machined surface profiles are displayed at the same position, the same angle, and the same magnification.

FIG. 2 shows an example in which the computationally-machined surface profile based on the command position and the computationally-machined surface profile based on the real position are both displayed as the computationally-machined surface profiles determined by the machined surface profile simulator 13, in parallel with the machined surface profile determined by measurement by the machined surface profile measurer 14. However, the present invention is not limited to this example. Only one of the computationally-machined surface profiles may be displayed in parallel with the machined surface profile measured by the machined surface profile measurer 14.

Figure 3:
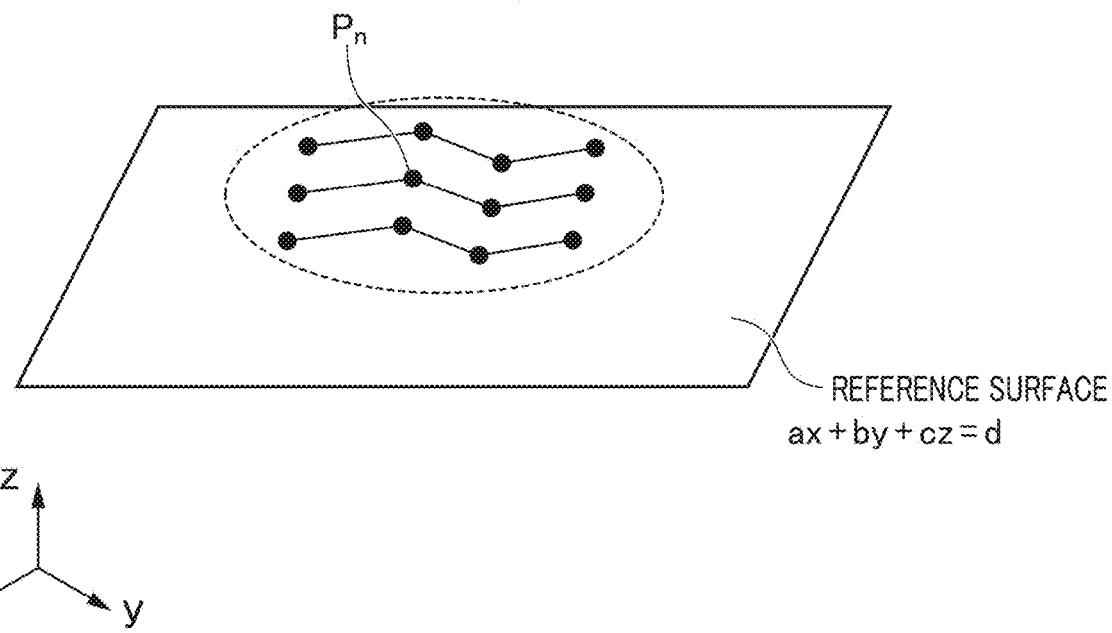
FIG. 3 is a diagram illustrating a method of calculating a reference plane of a machined surface profile.
Figure 4:
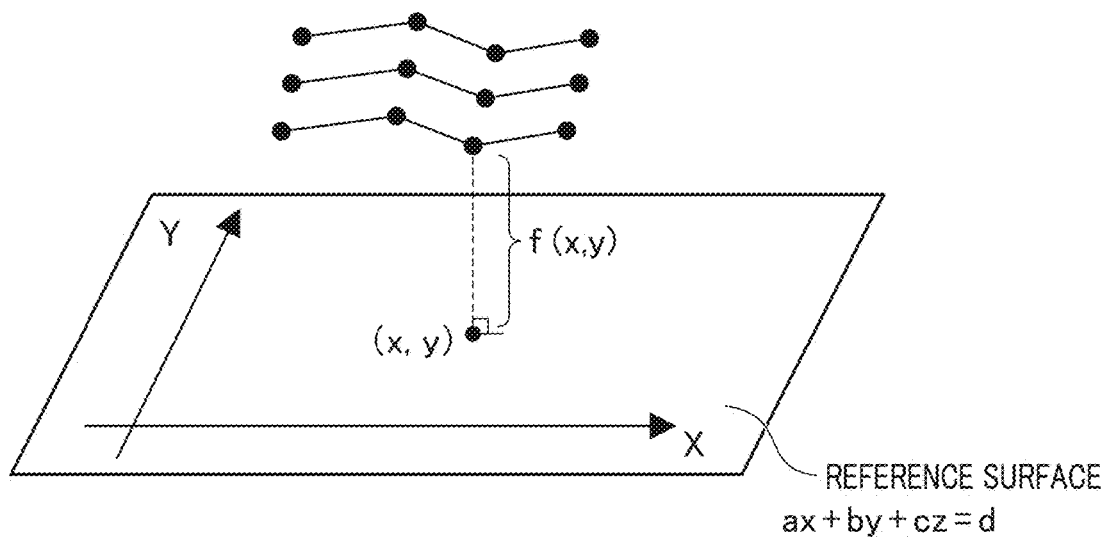
FIG. 4 is a diagram illustrating alignment of coordinates on the reference plane of the machined surface profile.

Here, a method of displaying the computationally-machined surface profile determined by the machined surface profile simulator 13 and the machined surface profile measured by the machined surface profile measurer 14 in alignment with each other will be described with reference to FIGS. 3 and 4. FIG. 3 is diagram illustrating a method of calculating a reference plane of a machined surface profile. FIG. 4 is a diagram illustrating alignment of coordinates on the reference plane of the machined surface profile.

In order to display the computationally-machined surface profile determined by the machined surface profile simulator 13 and the machined surface profile measured by the machined surface profile measurer 14 in alignment with each other, it is necessary to calculate a reference surface of each surface profile. For this purpose, a method of deriving a formula for the reference plane from a group of points on a machined surface of interest will be described. First, points on the machined surface are represented by $P_n$ ($X_n$, $Y_n$, $Z_n$), and the reference plane d is defined as $d=aX+bY+cZ$. A distance $l_n$ from the point $P_n$ on the machined surface to the reference plane d is given by the following equation (1):

[Math. 1]

$$l_n = |aX_n + bY_n + cZ_n - d| \mathrm{sqrt}(a^2+b^2+c^2) \qquad \text{Equation (1)}$$

A plane where a sum L of the squares of the distances from each machining point is minimized is defined as the reference plane. That is, a, b, c, and d with which L given by the following equation (2) is minimized are determined.

[Math. 2]

$$L = \Sigma 1 n^2 \quad \text{Equation (2)}$$

Specifically, a matrix A is defined by equation (3) below, and then, singular value decomposition (SVD) is performed on matrix A, thereby calculating the reference plane.

[Math. 3]

$$A = \begin{pmatrix} X1 & Y1 & Z1 \\ X2 & Y2 & Z2 \\ \vdots & \vdots & \vdots \\ Xn & Yn & Zn \end{pmatrix} \quad \text{Equation (3)}$$

A vector v corresponding to the smallest singular value σ is the normal vector of the reference plane to be determined. Therefore, if v=(a, b, c) is determined, the reference plane d can be calculated according to the following equation (4).

[Math. 4]

$$d = 1/n\Sigma(aXn + bYn + cZn) \quad \text{Equation (4)}$$

Although the method of calculating the reference plane from the coordinate values of the group of points has been described above, the present invention is not limited thereto. For example, an ideal machined surface may be externally set to be used as the reference surface.

Next, following the calculation of the reference plane in the manner described above, a coordinate system (X-axis and Y-axis) is newly defined on the calculated reference plane. Further, a function representing unevenness information Z at a point (x, y) projected orthogonally on the reference plane from the machining point is defined by the following equation (5).

[Math. 5]

$$z = f(x, y) \quad \text{Equation (5)}$$

Then, for example, when the unevenness information of the machined surface is obtained by actual measurement using a measurement device such as a surface roughness meter, the measurement is conducted in a state where the directions of the X-axis and the Y-axis and the origin position on the reference plane of the actually-machined surface profile are aligned with those on the reference plane of the computationally-machined surface profile based on the motor position information. In this way, the machined surface profiles can be aligned with each other.

The present embodiment exhibits the following effects. The display unit 1 according to the present embodiment includes: the motor position information acquirer 11 that acquires motor position information including at least one of the command position or the real position of the motor 4 that drives drive shafts of the machine tool 5; the machine information acquirer 12 that acquires machine information including the drive shaft configuration and the tool geometry of the machine tool 5, and including the shape of an unmachined workpiece; the machined surface profile simulator 13 that performs a simulation of machining a workpiece based on a machining program, and determines a computationally-machined surface profile of the workpiece simulated to be machined, based on the motor position information acquired by the motor position information acquirer 11 and the machine information acquired by the machine information acquirer 12; the machined surface profile measurer 14 that measures a machined surface profile of a machined workpiece that has actually been machined based on the machining program; and the machined surface profile display 15 that displays the computationally-machined surface profile determined by the machined surface profile simulator 13 in parallel with the machined surface profile measured by the machined surface profile measurer 14. This feature allows a user to visually and directly compare the computationally-machined surface profile determined based on the motor position information with the machined surface profile obtained by actual measurement of the machined workpiece. As a result, causes of a defective surface on a machined surface and contour errors can be identified in a short period of time. For example, suppose that a defect on the machined surface or a contour error has occurred. In this case, if no remarkable differences are found between the machined surface profiles, a presumption can be made that the machining program has a problem. If all the machined surface profiles differ from one another, a presumption can be made that the tool or the like has a problem. If the computationally-machined surface profile based on the command position alone differs from the rest, a presumption can be made that a problem has occurred in the position control of the motor 4. If the machined surface profile measured by the machined surface profile measurer 14 alone differs from the rest, a presumption can be made that the tool or the like has a problem. Accordingly, motor control can be adjusted quickly, and the effect of the adjusted motor control can be easily checked without the need for actual machining.

Further, according to the present embodiment, the machined surface profile display 15 is configured to display the computationally-machined surface profile determined by the machined surface profile simulator 13 and the machined surface profile measured by the machined surface profile measurer 14 at the same position, the same angle, and the same magnification. This feature further facilitates the comparison between the machined surface profiles, and makes it possible to identify the causes of a defective surface on a machined surface and contour errors in a shorter period of time.

Furthermore, according to the present embodiment, when a change is made to the position, the angle, or the magnification at which one of the computationally-machined surface profile determined by the machined surface profile simulator 13 and the machined surface profile measured by the machined surface profile measurer 14 is displayed, the machined surface profile display 15 changes the position, the angle, or the magnification at which the other machined surface profile is displayed, in conjunction with the change to the one machined surface profile. This feature further facilitates the comparison between the machined surface profiles, and makes it possible to identify the causes of a defective surface on a machined surface and contour errors in a shorter period of time.

Note that the present invention is not limited to the embodiment described above, but encompasses modifications and improvements made within the scope in which the object of the present invention can be achieved.

EXPLANATION OF REFERENCE NUMERALS

1: Display Unit
2: Numerical Control Unit
3: Servo Control Unit
4: Motor 5: Machine Tool
11: Motor Position Information Acquirer
12: Machine Information Acquirer
13: Machined Surface Profile Simulator
14: Machined Surface Profile Measurer
15: Machined Surface Profile Display

What is claimed is:

1. A display unit for displaying a machined surface profile of a workpiece, the display unit comprising:
- a motor position information acquirer that acquires motor position information including at least one of a command position or a real position of a motor that drives a drive shaft of a machine tool;
- a machine information acquirer that acquires machine information including a drive shaft configuration and a tool geometry of the machine tool, and including a shape of an unmachined workpiece;
- a machined surface profile simulator that performs a simulation of machining a workpiece based on a machining program, and determines a computationally-machined surface profile of the workpiece simulated to be machined, based on the motor position information acquired by the motor position information acquirer and the machine information acquired by the machine information acquirer;
- a machined surface profile measurer that measures a machined surface profile of a machined workpiece that has actually been machined based on the machining program; and
- a machined surface profile display that displays the computationally-machined surface profile determined by the machined surface profile simulator, in parallel with the machined surface profile measured by the machined surface profile measurer.

2. The display unit according to claim 1, wherein the machined surface profile display displays the computationally-machined surface profile determined by the machined surface profile simulator and the machined surface profile measured by the machined surface profile measurer at the same position, the same angle, and the same magnification.

3. The display unit according to claim 1, wherein when a change is made to a position, an angle, or a magnification at which one of the computationally-machined surface profile determined by the machined surface profile simulator and the machined surface profile measured by the machined surface profile measurer is displayed, the machined surface profile display changes the position, the angle, or the magnification at which the other machined surface profile is displayed, in conjunction with the change to the one machined surface profile.

4. The display unit according to claim 2, wherein when a change is made to a position, an angle, or a magnification at which one of the computationally-machined surface profile determined by the machined surface profile simulator and the machined surface profile measured by the machined surface profile measurer is displayed, the machined surface profile display changes the position, the angle, or the magnification at which the other machined surface profile is displayed, in conjunction with the change to the one machined surface profile.

* * * * *